Dec. 31, 1963   A. BRUNNER   3,116,444
REMOTE DATA TRANSMISSION AND POSITION CONTROL APPARATUS
Original Filed March 10, 1959   3 Sheets-Sheet 1
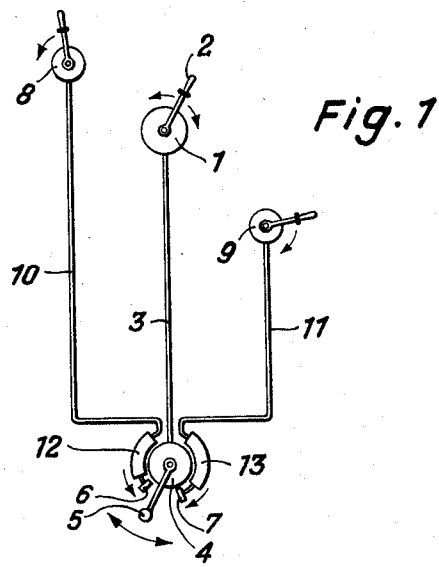
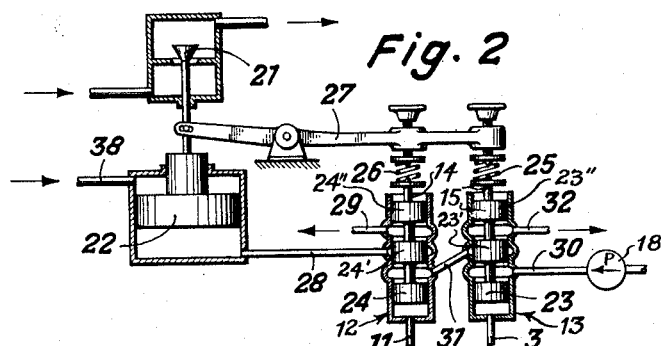
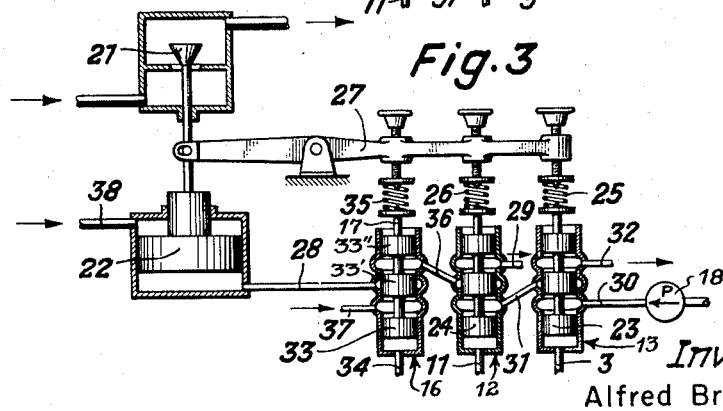
Inventor:
Alfred Brunner
BY
ATTORNEYS

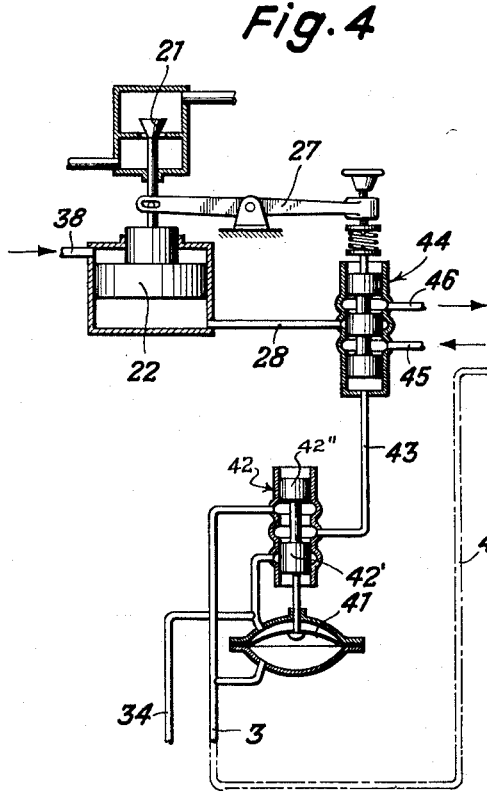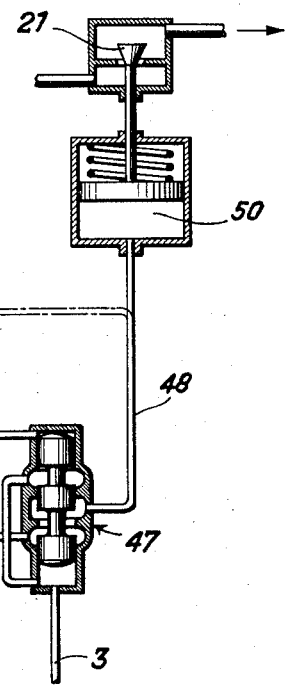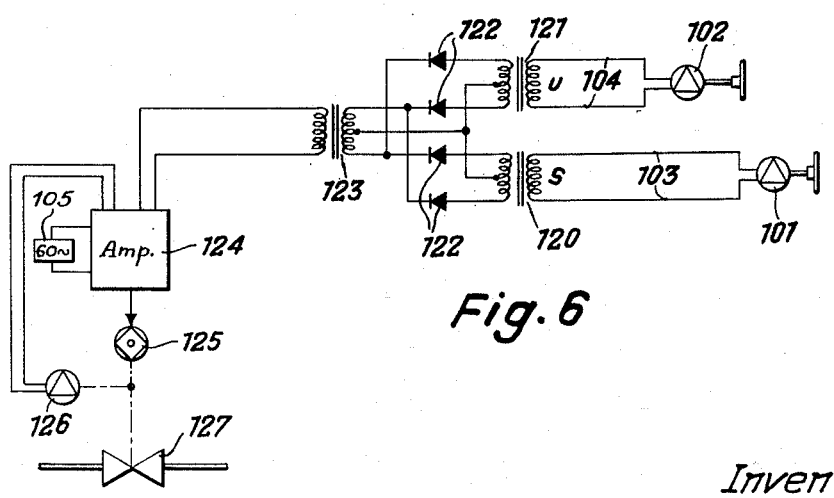

United States Patent Office 3,116,444
Patented Dec. 31, 1963

3,116,444
REMOTE DATA TRANSMISSION AND POSITION CONTROL APPARATUS
Alfred Brunner, Winterthur, Switzerland, assignor to Sulzer Freres, Societe Anonyme, Winterthur, Switzerland, a Swiss company
Original application Mar. 10, 1959, Ser. No. 798,463. Divided and this application Nov. 20, 1961, Ser. No. 153,927
3 Claims. (Cl. 318—28)

This application is a division of my copending application Serial No. 798,463, filed March 10, 1959, now abandoned.

This invention relates to apparatus for remote position control and more particularly to apparatus for transmission and remote indication, reproduction or establishment of a position setting, in which apparatus position signals representative of the setting are sent via a position transmission line from a transmitter to a receiver whose range of indications or positions is limited.

In a device of this kind, as used for example in servo or control technique, the setting to be remotely indicated or established may represent a pressure, an electrical voltage or the position of a mechanical element. Correspondence is established in the transmitter between the signal generated for transmission and the quantity whose value is to be remotely indicated. The signal is then passed through a transmission line to the receiver where there is reproduced therefrom an indication which accordingly reflects the instantaneous position at the transmitter of the element whose condition is to be communicated by means of the system.

In servo or control problems it is often necessary to limit the range of motion of a mechanical device whose position is to be controlled, and also to make adjustable, in extent and in position with respect to other elements, the range of motion so limited.

The invention provides a data transmission system for these purposes. According to the invention there are provided, in addition to the position data transmission device proper, at least one means to generate a signal representative of position limits and at least one signal channel for limit signals by means of which the limits on the range of motion or position of the device to be controlled at the receiver can be remotely adjusted.

In this way there is achieved not only remote control over the range of positions, settings or values which can be exhibited or produced at the receiver but moreover the establishment and control of this range is made independent of any malfunctioning in the transmission of positional data itself.

For this purpose there can be provided at least one organ or element which compares the instantaneous position of the receiver with the limit indicating signals. If this instantaneous position falls outside the range defined by the limit signal, the transmitted position signals can be so modified as to bring the position of the receiver back into the authorized range. This achieves among other things a simplification of the apparatus, inasmuch as special servo devices for adjustment of limit stops in the receiver are made unnecessary.

There may according to the invention be provided at least one element which, with the aid of the position signals, compares the instantaneous position of the receiver with the limit signal. If the position of the receiver is found upon this comparison to be outside the permitted range, the transmitted position signals can be so modified as to bring the position indication at the receiver back into the authorized range.

The system can be so established that alternating current voltages function as signals. According to the invention there is provided, for comparison of the position signals with a limit signal, a comparison device comprising a pulse transformer to whose primary winding the position signals are applied. The comparison device further comprises a second pulse transformer to whose primary winding the limit signal is applied, and it further comprises a summing transformer having an intermediate conductor connecting the midpoint of its primary winding with the midpoints of the secondaries of the two pulse transformers. Four coupling conductors are also provided which connect the four ends of these secondaries in co-phasal pairs with the two ends of the primary of the summing transformer. A rectifier is inserted in each of these four connections which conducts in the direction toward the summing transformer but which blocks current flow toward the pulse transformer so that at all times the summing transformer receives only the stronger of the pulses or signals fed to the two pulse transformers. From the summing transformer this stronger signal is further conducted for control of the receiver.

The system may be further so constructed to provide a first comparing device for comparison of the position signal with the lower limit signal and a second comparison device for comparison of the position signal with the upper limit signal. These devices are constructed to pass only the stronger of the two signals for control of the receiver. The secondary windings of the summing transformers of these two comparison devices are so connected in opposition that whenever the two comparison devices transmit the position signal, the signals thus derived at the output of these comparison devices annul each other. Moreover, the second comparison device continuously balances the upper limit signal against the position signal transmitted thereto from the secondary winding of its summing transformer. In this way when this comparison device passes the upper limit signal, the two limit signals annul each other so that the position signal is transmitted to the receiver so long as it falls within the range limited by the upper and lower limit signals.

The invention will now be further described with reference to the accompanying drawings in which:

FIG. 1 is a schematic diagram of one embodiment of the invention;

FIGS. 2 and 3 are diagrammatic sectional views of position control receiver devices responsive to the pressure of a fluid as a signal source and in which the instantaneous position of the receiver device is compared with the limiting signal by feedback of a servo motor;

FIGS. 4 and 5 are diagrammatic sectional views of position control receiver devices in which the pressure of a fluid is likewise representative of the data being transmitted for remote position control but in which the instantaneous position of the receiver is tested by a comparison of the position signal with the limit signal;

FIGS. 6 and 7 are diagrams of electrical position control receiver devices according to the invention, in which the data to be transmitted is in the form of an alternating current voltage.

Figure 7:
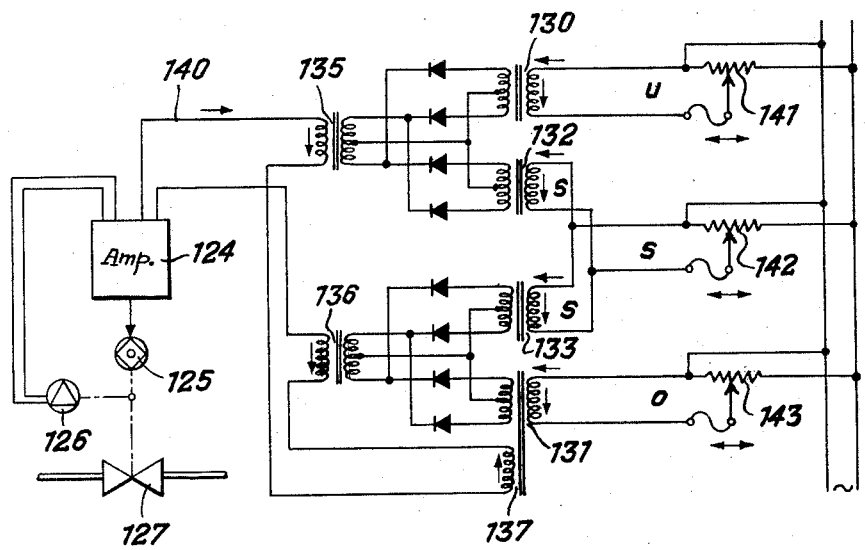

In FIG. 1 reference character 1 indicates a generator of position signals representative of the instantaneous position of a control lever 2. These signals are transmitted via a channel 3 to a receiver 4 where they are employed to control correspondingly the position of a lever 5. The position of the lever 5 is accordingly subordinated to and representative of the position of the lever 2. The range of positions or adjustment of receiver lever 5 is limited by stops 6 and 7 which can be adjusted in position by operation of remotely located limit signal transmitters 8 and 9 which are connected by channels 10 and 11 respectively with limit signal receivers 12 and 13.

In FIG. 2 reference character 21 represents a needle valve of a steam power system, not shown. The position of the valve is controlled by the piston 22 forming part of a servo motor device. For remote control of valve 21, fluid pressures are generated, by means of separate transmitter devices which may be of known type, in the position signal channel 3 (for position signal indication), and in the limit signal channel 11 (for limit setting). As shown, channels 3 and 11 take the form of pipes or tubes. These pressures operate on the lower surfaces of the pistons 23 and 24, which form respectively parts of valves generally indicated at 12 and 13 for control of a hydraulic fluid supplied under pressure to valve 13 at an inlet 30 from a source 18. The stress thus exerted on these pistons is opposed by springs 25 and 26, which are engaged between the movable bodies 14 and 15 of valves 12 and 13 and a lever 27 constituting a feedback element in the servo motor which comprises piston 22, valves 12 and 13, and the source of fluid under pressure to conduit 30.

If the pressure in the limit signal channel 11 is low, the spring 26 pushes the valve body 14 so far down that the middle piston 24' thereon opens the conduit 28, which leads to the lower side of piston 22, to a discharge outlet 29. The working fluid remaining under the piston 22 is thus discharged at 29 so that piston 22 falls and needle valve 21 closes.

If the pressure in the position signal channel 3 is raised in order to open the valve 21, such increasing pressure lifts valve body 15 with its pistons 23, 23' and 23", and compresses spring 25. Power fluid entering from the channel 30 is then permitted to pass through the channel 31 to the upper side of the piston 24. Piston 24' however will thereupon close channel 28 with downward motion, and an opening of the valve 21 is prevented. It is only when the pressure in the limit signal channel 11 is raised, as by operation of the limit signal source 9 (FIG. 1) that the valve body 14 and its pistons 24, 24' and 24" are lifted to bring the channels 28 and 31 into communication. This permits the passage of the servo power fluid from the high pressure inlet 30 to the lower side of piston 22. Piston 22 is accordingly lifted and valve 21 opened. This however rotates lever 27, and the right hand end thereof falls, compressing both of springs 25 and 26. If with this compression the stress exerted by spring 26 exceeds that established by the limit signal channel 11 on the lower surface of piston 24, valve body 14 will fall again, closing off conduit 28 at piston 24' and preventing further lifting of piston 22 by the servo power fluid. This device accordingly compares the position of piston 22 with the upper position limit established by the pressure in conduit 11. It moreover adjusts the setting of valve 21 back into the permitted range if the opening of the valve should exceed this upper limit.

Within this range on the other hand the position signal pressure in channel 3 is fully operative to control the setting of valve 21. If this pressure is increased, as by operation of the transmitter device 2, conduits 30 and 31 will be brought into communication upon compression of spring 25 and lifting of valve body 15 with its piston 23; and the operating piston 22 will be lifted to open the valve 21. If on the contrary the pressure in channel 3 falls, expansion of spring 25 and fall of valve body 15 will bring channel 31 into communication with the spillover channel 32. Piston 22 will thereupon fall and the valve will close.

In order to facilitate downward motion of piston 22 its upper surface may be subjected to a substantially constant pressure at a channel 38 which connects to the same source of working fluid as the channel 30.

In FIG. 3 corresponding reference characters identify the same elements of structure as in FIG. 2. The apparatus of FIG. 3 differs from that of FIG. 2 in that it comprises an additional valve 16 for control of a lower limit on the range of positions to which the valve 21 can be adjusted. Consequently there is coupled to this valve 16 a second limit signal channel 34 to which, by means of a transmitter which may be of known type, pressures representative of such a lower limit may be applied. By selection of the pressure present in the conduit 34 the lower limit of motion for the piston 22 and its valve 21 may be established. If piston 22 should sink below the position corresponding to this lower limit the lever 27 rotates to permit expansion of the spring 35. The pressure present in conduit 34 then lifts the body 17 of valve 16 into a position such as that shown in FIG. 3. Its piston 33' thereupon closes off the connection between conduits 28 and 36, the latter of which connects between valves 12 and 16. In place of this connection a connection is established, by lifting of piston 33' in valve 16, between conduit 28 and an inlet conduit 37 for the servo fluid. Conduit 37 is thus supplied with servo fluid under pressure in the same manner as conduit 30. This raises again the servo piston 22, rotating the lever 27 in the opposite direction (clockwise, in the figure). Spring 35 is again compressed and the valve body 17 is thereby returned to a position in which piston 33' cuts off conduit 28 from connection with inlet conduit 37. Instead, conduit 28 is placed in communication with the conduit 36 leading from valve 12.

The servo piston 22 therefore returns automatically to within the established range of positions even though the position signal pressure in line 3 declines below the level corresponding to the lower limit of positions for piston 22 established by the lower limit signal pressure in line 34.

FIGS. 4 and 5 show arrangements in which the position signal, to which the position of the receiver indicator is made to correspond, is directly compared with the limit position signal. Corresponding reference characters identify the same parts, as in FIGS. 2 and 3.

In FIG. 4 the position signal channel 3 and the channel 34 for lower limit signals connect to the opposite halves of a chamber divided by a flexible diaphragm 41. This diaphragm is coupled to a control valve 42 having pistons 42' and 42". If the position-representative pressure in conduit 3 is higher than the lower limit position pressure in conduit 34, the pressure in conduit 3 stretches the diaphragm 41 in an upward direction, lifting pistons 42' and 42". In this position of valve 42 conduit 3 connects with conduit 43 for control of servo motor 22 via its valve 44. If instead the position signal pressure in conduit 3 falls below the lower limit position pressure in conduit 34, the diaphragm 41 is stretched downwardly so that the control piston 42" moves downwardly and closes off channel 43 from connection with channel 3. Instead, channel 43 will then be connected to the limit pressure conduit 34. Valve 21 is thus held open by operation of valve 44, in a position corresponding to the lower limit signal in channel 34. Otherwise stated, the range of motion for valve 21 is thus provided with a lower limit.

The servo motor 22 includes functionally the valve 44 and a source (not shown) of hydraulic operating fluid supplied under pressure to the valve at an inlet 45. The valve 44 is similar in construction to the valve 13 of FIG. 2, and possesses a low pressure outlet for the operating fluid at 46. Servo motor 22 further includes a feedback channel comprising lever 27 coupled between valve 21 and valve 44. As in FIGS. 2 and 3, channel 38 connects from the source of hydraulic fluid under pressure to the upper side of piston 22 for downward motion of valve 21.

In FIG. 5 the position signal conduit 3 and the conduit 11 for upper position limit signals are connected to opposite sides of a three-piston control valve 47. So long as the position signal pressure in conduit 3 is below that in conduit 11, valve 47 is held in its depressed position, wherein passage is provided for the pressure signal from channel 3 to a channel 48. If however the position signal pressure in conduit 3 should exceed the upper limit position pressure in conduit 11, control valve 47 will be lifted to the position shown in the figure, closing off conduits 48 and 3 from each other and connecting conduits 48 and 11, thus establishing an upper pressure limit for the valve 21 in FIG. 5.

As is evident from the drawings, the control valve 42 of FIG. 4 always passes to the higher of the two pressures applied to it. On the contrary the control valve 47 of FIG. 5 always passes the lower pressure. Valve 42 and conduit 34 thus establish a lower limit for the position signal whereas valve 47 and conduit establish an upper limit therefor.

A complete "receiver" for control of valve 21 in FIG. 4 between upper and lower limits may thus be obtained by connecting valves 42 and 47 in series, as indicated by the dashed conduit 49 connecting the outlet conduit 48 from valve 47 in FIG. 5 with the inlet conduit 3 to valve 42 in FIG. 4. With such a connection there will appear in conduit 43 of FIG. 4 a position signal effectively limited between upper and lower extreme values.

As indicated by the servo motor 50 of FIG. 5, it is possible in certain cases, particularly when the reactions of valve 21 on the servo motor are small, to dispense with the feedback components and likewise with a separate supply of working fluid to the servo motor, the servo motor 50 being operated by the fluid carrying the position and upper limit signals in conduits 3 and 11 of FIG. 5.

FIGS. 6 and 7 illustrate embodiments of the invention in which the position and limit signals are electrical in nature, namely alternating current voltages. The position signal is there identified at S. The signal representative of the lower limit of positions is identified at U and the signal representative of the upper limit is identified at O.

Referring to FIG. 6, the voltage values U and S are adjusted by means of voltage control devices 101 and 102, which may be variable transformers for example, and which are connected to a common source of alternating current voltage, not shown. These devices 101 and 102 are connected by transmission lines 103 and 104 respectively to the primary windings of transformers 120 and 121.

The mid-points of the secondary windings of these transformers are connected together and to the midpoint of the primary winding of the summing transformer 123. The four endpoint terminals of the secondaries of the transformers 120 and 121 are connected by four conductors in co-phasal pairs with the two terminals of the primary of transformer 123. A rectifier 122 is inserted in each of these four conductors, poled to permit passage of current toward the summing transformer. Diode or other rectifying elements may be used for this purpose.

By means of this circuit the signal voltages S and U are compared and it is only the greater of the two which reaches transformer 123 and which is accordingly passed therefrom to an amplifier 124. This amplifier controls operation of a motor 125 which is coupled to the machine element 127 whose position is to be controlled. Servo operation is provided by a feedback loop between a variable transformer 126, whose movable element is linked to motor 125, and the input of amplifier 124. If the position signal S falls below the lower limit signal U, it is the latter which is transmitted through the system, assuring that the machine element 127 is positioned to correspond with the value of this limit signal. FIG. 6 thus illustrates remote control by electrical means of the position of the device 127, a valve in a pipeline, for example, with the valve position held at or above a lower limit set by adjustment of transformer 102.

In FIG. 7 the voltage signals U, S and O are set up from a common source by means of potentiometers 141, 142 and 143. The signals U and O are applied respectively to the primaries of transformers 130 and 131, the latter of which has a supplementary secondary winding 137. Signal S is applied to the primary of two transformers 132 and 133 in parallel. A transformer 135 sums the secondary voltage of transformers 130 and 132 and a transformer 136 sums the voltages of the secondary in transformers 133 and 131, in the manner described above with reference to transformers 120, 121 and 123 of FIG. 6. In each case, it is only the stronger of the two signals which is allowed to pass to the transformers 135 and 136. The supplementary winding 137 on transformer 131 is connected in series with the secondaries of both of transformers 135 and 136 in a connection leading to the input of amplifier 124. Arrows on the diagram indicated the relative voltage polarities at any given instant of time in the three windings so connected in series.

If the position signal S is of a value below that of the lower limit signal so that the three signals are ordered S<U<O in magnitude, it is only the signal U which is greater than S which reaches transformer 135. Similarly, since S is smaller than O, it is only O which reaches transformer 136. In the series connection of the secondaries of 135 and 136, U and O add. Signal O is however cancelled out by the oppositely poled winding 137 of transformer 131.

The signal reaching amplifier 124 thus comprises U−O+O, or U, and is therefore independent of S.

For values of the position signal S between the limits U and O, it is only S of value greater than U which reaches transformer 135, and only O of value greater than S which reaches transformer 136. The signal O is however once again cancelled by the oppositely poled winding 137. The signal reaching amplifier 124 thus comprises S−O+O, or S, so that within the range of permitted values the position signal S is effective on amplifier 124 and on the associated servo mechanism controlling the position of device 127.

If the position signal S rises to a value above the upper limit value U so that the signals are ordered in magnitude U<O<S, it is only S, of value greater than O and hence greater than U as well, which reaches the two transformers 135 and 136. The resultant signals in the secondaries of transformers 135 and 136 however cancel out in view of their opposite connection in the input circuit to amplifier 124. The only signal there effective is consequently the signal O, in winding 137.

The input signal to the amplifier 124 thus comprises S−S+O, or O, which is independent of S. The device 127 is therefore limited to positions corresponding to the upper limit signal values O or lower.

Figure 8:
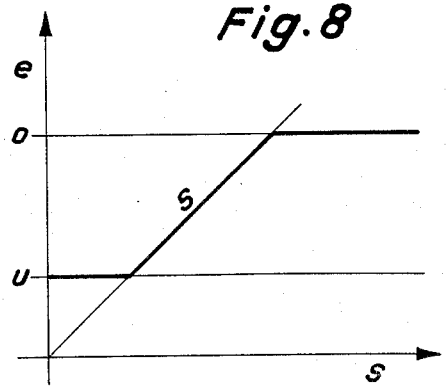
FIG. 8 is a diagram useful in the explanation of the invention.

Position limitation is therefore achieved between upper and lower limits as graphically indicated in FIG. 8. If a position signal S of zero value is generated, the signal reaching amplifier 124 is of the value U, and the amplifier 124 is activated by this signal until the position signal S reaches a value greater than U. For higher values of the position signal S the amplifier 124 is actuated thereby until the position signal S reaches the upper limit signal value O. Thereupon signal S becomes ineffective and the input to the amplifier is limited to the value O.

It will be understood that in the apparatus of FIG. 2 the source 18 of hydraulic fluid applied under pressure to conduit 30 may be considered as a source of power and that the piston 22 can be considered as a motor, coupled to a load in the form of valve 21 and also coupled by lever 27 into a feedback loop to valves 12 and 13 which control the application of power from conduit 30 to piston 22 and which also compare the position of that piston, and of valve 21, with the signals applied by hydraulic pressure at channels 3 and 11.

In each of valves 12 and 13, for a given pressure at its channel 3 or 11, the valve body 14 or 15 assumes always an equilibrium position in which the force exerted by that channel, 3 or 11, on the valve body is equal to the stress in the spring 26 (for valve 12) or 25 (for valve 13). Since the stress of each of these springs is a function of the position of piston 22 and lever 27 as well as of the valve body, the position of the valve bodies in valves 12 and 13 will change with the position of piston 22.

Valve 12 and its channel 11 may be used to establish an upper limit on the position of piston 22 because by proper choice of the pressure in channel 11, the valve body 14 will over a range of positions of piston 22, which range has an upper limit, hold open communication between lines 28 and 31. Piston 22 cannot rise above this limit because cutoff of lines 28 and 31 will separate piston 22 from line 30. The actual position of piston 22 within this range, i.e. below this upper limit, is controlled by valve 13.

For every pressure applied at channel 3, below a pressure corresponding to this upper limit, the body 15 of valve 13 will maintain communication between lines 30 and 31 until piston 22 rises to a position at which, by motion of lever 27, the stress developed in spring 25 is balanced by the stress exerted on piston 23 (plus the stress exerted from channel 30 on piston 33'). At this position of piston 22 the valve body 15 will have moved to the position which closes off line 31 from line 30. Valves 12 and 13 therefore include two valves connected in series between channel 30 and piston 33, and they further include two devices each for comparing the position of piston 22 with a signal representative of position for piston 22, one signal being in channel 11, the other in channel 3.

The embodiment of FIG. 3 is similar except that the valve 12 is duplicated as a valve 16. Valve 16 defines a lower limit of position, for piston 22 and valve 21 in that, for all positions of piston 22 above this lower limit, which is a function of the pressure in line 34, the body 17 rides low enough to permit communication between lines 36 and 28. Fall of piston 22 below this lower limiting position is prevented by closure of communication between lines 28 and 36 and substitution therefore of communication between lines 37 and 28. Line 37 is connected to the high pressure source 18.

Departure of the body 15 of valve 13 from this position at which communication is just cut off between lines 31 and 30 on the one hand and between lines 31 and 32 on the other hand is a measure of the error signal of the servo mechanisms which these figures illustrate.

In FIG. 4, valve 44 corresponds in function to valve 13 of FIGS. 2 and 3. For limitation on the positions assumable by piston 22 in FIG. 4, it is the signal pressure applied to this valve 44 at line 43 which itself is limited. By diaphragm 41 and valve 42 it is prevented from falling below a lower limit (that of line 34), and by valve 47 of FIG. 5 it is prevented from rising above an upper limit.

In FIGS. 6 and 7, likewise, the amplifier 124 constitutes a valve, controlling the flow of energy between the electric mains 105 and the motor 125, in accordance with the value of the error signal represented by the difference between the output signals from transformers 123 and 126 in FIG. 6. The amplifier 124 thus also constitutes a comparison device, comparing the signals from transformers 123 and 126 to develop this error signal, which is used in control of the flow of power from the mains to motor 125. In FIG. 7 the error signal is represented by the difference, taken in amplifier 124, between the output of transformer 126 on the one hand and the algebraic sum of the outputs of transformers 135, 136 and 137 on the other hand.

While the invention has been described herein in terms of a number of preferred embodiments, the invention is not itself limited thereto, the scope of the invention being rather set forth in the appended claims.

I claim:

1. A servo mechanism comprising a motor, a source of electrical desired motor position signals, a source of electrical motor position limit signals, a source of electrical actual motor position signals, means to compare said desired and limit signals and to pass the extreme thereof, means to compare the signal so passed with said actual position signals, and means responsive to said comparison to control the application of energy to said motor.

2. A servo mechanism comprising a source of energy, a motor, a source of electrical motor position signals, separate sources of electrical motor position limit signals, separate transformer means to compare said motor position signals with each of said position limit signals and to pass the larger in each case, means to sum in opposite polarity the signals so passed, means to apply in series with said sum one of said position limit signals in polarity opposite to that in which it is passed by one of said transformer means, and means responsive to the sum of said sum and of said one position limit signal in opposite polarity to control the application of energy from said source to said motor.

3. A servo mechanism comprising a source of energy, a motor, a source of electrical desired motor position signals, a source of electrical actual motor position signals, separate sources of electrical motor position limit signals, separate transformer means to compare said desired motor position signal with each of said position limit signals and to pass the larger in each case, means to sum in opposite polarity the signals so passed, means to apply in series with said sum one of said position limit signals in polarity opposite to that in which it is passed by one of said transformer means, means to compare said actual motor position signals with the sum of said sum and of said one position limit signal in opposite polarity, and means responsive to said comparison to control the application of energy from said source to said motor.

References Cited in the file of this patent
UNITED STATES PATENTS

| | | |
|---|---|---|
| 2,674,708 | Husted | Apr. 6, 1954 |
| 2,768,359 | Side | Oct. 23, 1956 |
| 3,036,253 | Bramley | May 22, 1962 |